(12) United States Patent
Yamamoto (10) Patent No.: US 10,622,917 B2
(45) Date of Patent: Apr. 14, 2020

(54) ELECTROSTATIC-TYPE ELECTROMECHANICAL TRANSDUCER

(71) Applicant: CITIZEN WATCH CO., LTD., Tokyo (JP)

(72) Inventor: Izumi Yamamoto, Saitama (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 31 days.

(21) Appl. No.: 16/084,537

(22) PCT Filed: Mar. 16, 2017

(86) PCT No.: PCT/JP2017/010757
§ 371 (c)(1),
(2) Date: Sep. 12, 2018

(87) PCT Pub. No.: WO2017/159813
PCT Pub. Date: Sep. 21, 2017

(65) Prior Publication Data
US 2019/0081576 A1   Mar. 14, 2019

(30) Foreign Application Priority Data

Mar. 17, 2016   (JP) ................ 2016-053782

(51) Int. Cl.
*H02N 1/00* (2006.01)
*H02N 1/08* (2006.01)
(52) U.S. Cl.
CPC ............ *H02N 1/004* (2013.01); *H02N 1/08* (2013.01)
(58) Field of Classification Search
CPC ............................................ H02N 1/00–1/12
See application file for complete search history.

(56) References Cited

U.S. PATENT DOCUMENTS

2006/0146472 A1   7/2006   Van Beek et al.
2014/0077657 A1   3/2014   Nakatsuka et al.
(Continued)

FOREIGN PATENT DOCUMENTS

CN   1813328 A   8/2006
JP   H09-163762 A   6/1997
(Continued)

OTHER PUBLICATIONS

World Intellectual Property Organization, Internal Search Report for PCT International Patent No. PCT/2017/010757, dated May 23, 2017.

(Continued)

*Primary Examiner* — Ramon M Barrera (57) ABSTRACT

In order to produce a larger output and smaller friction acting on a movable substrate of an electrostatic-type electromechanical transducer using electrostatic interaction between charged portions and opposing electrodes to transduce between electric power and motive power, the electrostatic-type electromechanical transducer includes: a fixed substrate; a movable substrate being movable while maintaining a predetermined distance between the fixed substrate and the movable substrate; charged portions disposed on a first surface of the movable substrate at intervals in a direction of movement of the movable substrate, the first surface facing the fixed substrate; opposing electrodes disposed on the fixed substrate in the direction of movement, the opposing electrodes facing the movable substrate; and a ground electrode facing a second surface of the movable substrate, the second surface being opposite to the first surface.

8 Claims, 9 Drawing Sheets

(56) References Cited

U.S. PATENT DOCUMENTS

2017/0110988 A1    4/2017  Izumi et al.
2017/0269557 A1    9/2017  Ihara et al.

FOREIGN PATENT DOCUMENTS

| JP | 2004-208392 A | 7/2004 |
|----|---------------|--------|
| JP | 2005-341675 A | 12/2005 |
| JP | 2009-232667 A | 10/2009 |
| JP | 2013-123337 A | 6/2013 |
| WO | 2013/132753 A1 | 9/2013 |
| WO | 2015/146483 A1 | 10/2015 |
| WO | 2016/027748 A1 | 2/2016 |

OTHER PUBLICATIONS

World Intellectual Property Organization, Written Opinion for PCT International Patent No. PCT/2017/010757, dated May 23, 2017.
China National Intellectual Property Administration, First Office Action for Chinese Patent Application No. 201780017533.2, dated Apr. 12, 2019.
The State Intellectual Property Office of the People's Republic of China, Decision of Rejection for Chinese Patent Application No. 201780017533.2, dated Jan. 3, 2020.

ELECTROSTATIC-TYPE ELECTROMECHANICAL TRANSDUCER

FIELD

The present invention relates to an electrostatic-type electromechanical transducer in which an electret material is used.

BACKGROUND

Electrostatic-type electromechanical transducers, such as electrostatic motors and electric generators, which use charged films having the characteristics of semi-permanently carrying an electric charge are known (for example, see Patent Literature 1). Such electrostatic-type electromechanical transducers include charged films made of an electret material, and opposing electrodes facing the charged films. The electrostatic motors generate driving force by using electrostatic attraction between the charged films and the opposing electrodes, whereas the electric generators generate electric power by using electrostatic induction caused by fluctuations of the overlapping area therebetween. Such electrostatic-type electromechanical transducers are relatively compact, and are thus considered for adoption into portable electric equipment, such as a wristwatch, which a human wears and carries.

Figure 12:
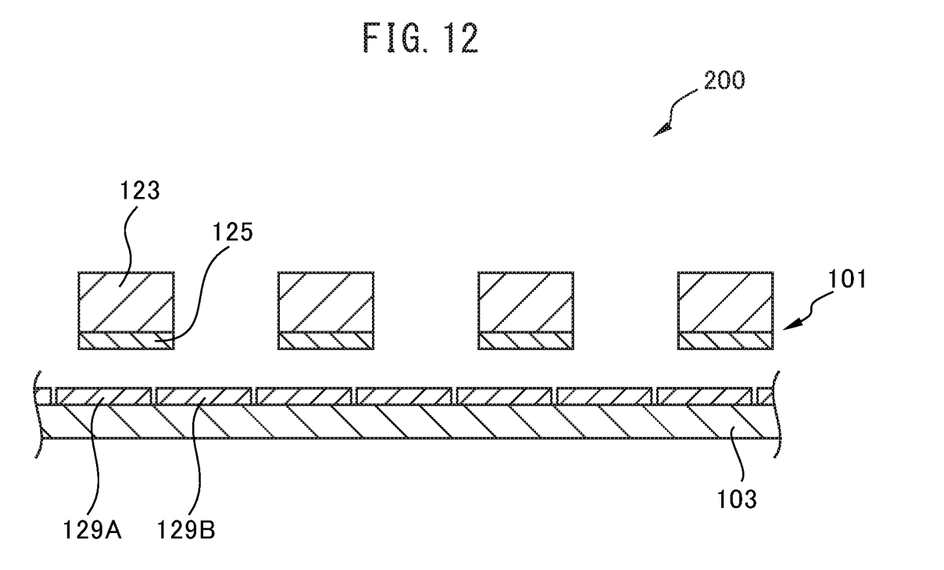
FIG. 12 is a cross-sectional view showing a principal part of a conventional electrostatic-type electromechanical transducer 200.

FIG. 12 is a cross-sectional view showing a principal part of a conventional electrostatic-type electromechanical transducer 200. The electrostatic-type electromechanical transducer 200 includes a movable substrate 101 composed of multiple connecting portions 123, a fixed substrate 103 disposed under and in parallel with the movable substrate 101, charged films 125 respectively provided on the lower surfaces of the connecting portions 123 of the movable substrate 101, and opposing electrodes 129A and 129B disposed on the upper surface of the fixed substrate 103 at intervals so as to face the charged films 125. If the electrostatic-type electromechanical transducer 200 is an electrostatic motor, the resultant force of electrostatic attraction which is caused by the opposing electrodes 129A and 129B and acts on the charged films 125 is the driving force. If the electrostatic-type electromechanical transducer 200 is an electric generator, electric power is taken out from each pair of the opposing electrodes 129A and 129B at the same time, by moving the charged films 125 relative to the opposing electrodes 129A and 129B.

CITATIONS LIST

Patent Literature

Patent Literature 1: Japanese Unexamined Patent Publication No. 2005-341675 (page 1. FIG. 2)

SUMMARY

It is known that the driving force f of an electrostatic motor in which an electret material is used is proportional to the product of the electric potential Vt of the charged films (charged portions) and the voltage Vb applied to the opposing electrodes. Therefore, the increase in the electric potential Vt of the charged films or the voltage Vb applied to the opposing electrodes leads to an increase in the driving force f. However, the increase in the voltage Vb applied to the opposing electrodes requires a boost of the voltage, and involves energy loss. Further, the increase in the electric potential Vt of the charged films requires an increase in the amount of electric charge stored in the charged films; however, there is a limit thereto.

Further, since attraction perpendicular to the surface of the movable substrate acts between the charged films and the opposing electrodes, as this attraction increases, the friction between the shaft supporting the movable substrate and its bearings becomes larger and increasingly prevents movement of the movable substrate. In this respect, the same applies to the electric generator in which an electret material is used.

The present invention is for addressing such a technical problem, and an object thereof is to provide an electrostatic-type electromechanical transducer which can produce a larger output, without large energy loss, and smaller friction acting on a movable substrate.

An electrostatic-type electromechanical transducer using electrostatic interaction between charged portions and opposing electrodes to transduce between electric power and motive power is provided. The electrostatic-type electromechanical transducer includes: a fixed substrate; a movable substrate being movable while maintaining a predetermined distance between the fixed substrate and the movable substrate; charged portions disposed on a first surface of the movable substrate at intervals in a direction of movement of the movable substrate, the first surface facing the fixed substrate; opposing electrodes disposed on the fixed substrate in the direction of movement, the opposing electrodes facing the movable substrate; and a ground electrode facing a second surface of the movable substrate, the second surface being opposite to the first surface.

Preferably, in the electrostatic-type electromechanical transducer, the ground electrode completely covers a region on the second surface of the movable substrate, the region corresponding to the places where the charged portions are disposed.

Preferably, in the electrostatic-type electromechanical transducer, the distance between the movable substrate and the fixed substrate is not less than 30 μm and not more than 150 μm.

In the electrostatic-type electromechanical transducer, the movable substrate and the fixed substrate may be disposed between a top plate and a main plate, and the ground electrode may be formed on the top plate or the main plate, and face the movable substrate. Alternatively, the movable substrate and the fixed substrate may be disposed between a top plate and a main plate, and the top plate or the main plate may serve as the ground electrode.

Preferably, in the electrostatic-type electromechanical transducer, the movable substrate is rotatable around a rotating shaft passing through the center of the movable substrate, and the charged portions and the opposing electrodes are radially disposed around the rotating shaft.

Preferably, the electrostatic-type electromechanical transducer further includes: a driving unit applying an alternating voltage to the opposing electrodes to generate electrostatic force between the charged portions and the opposing electrodes, thereby rotating the movable substrate; and a gear train coupled to the rotating shaft on the side opposite to the movable substrate with respect to the ground electrode, the gear train rotating together with the movable substrate to transmit rotational motion of the movable substrate to the outside of the electrostatic-type electromechanical transducer.

Alternatively, the electrostatic-type electromechanical transducer preferably further includes: a gear train coupled to the rotating shaft on the side opposite to the movable substrate with respect to the ground electrode, the gear train being driven by an external power source to rotate the rotating shaft and the movable substrate; and a charging unit storing electric power generated by electrostatic induction between the charged portions and the opposing electrodes in response to rotation of the movable substrate.

The electrostatic-type electromechanical transducer can produce a larger output, without large energy loss, and smaller friction acting on a movable substrate.

DESCRIPTION OF EMBODIMENTS

Hereinafter, with reference to the accompanying drawings, electrostatic-type electromechanical transducers will be explained in detail. However, it should be noted that the present invention is not limited to the drawings or the embodiments described below.

Figure 1:
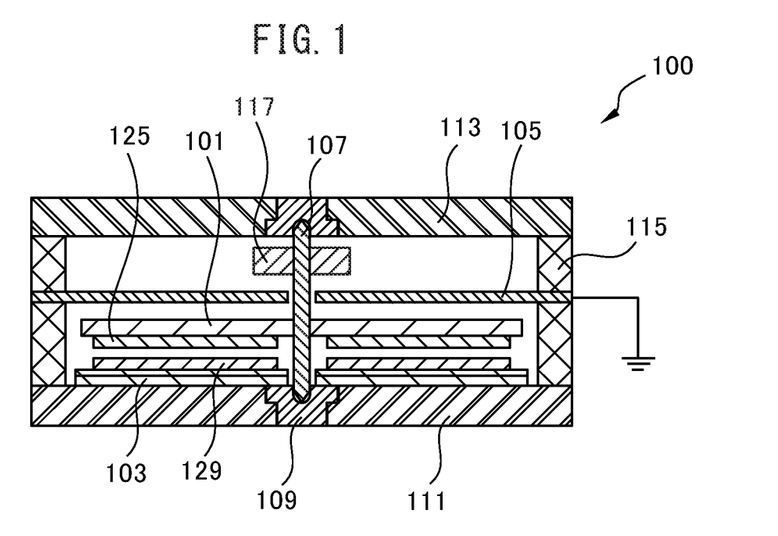
FIG. 1 is a cross-sectional view schematically illustrating the structure of an electrostatic motor 100.

FIG. 1 is a cross-sectional view schematically illustrating the structure of an electrostatic motor 100. The electrostatic motor 100 includes a movable substrate 101, a fixed substrate 103, a ground electrode 105, a gear 117, charged films 125, a driving circuit 127 (see FIGS. 3 and 4), and opposing electrodes 129. The electrostatic motor 100 is an example of the electrostatic-type electromechanical transducer, and uses electrostatic force generated between the charged films 125 and the opposing electrodes 129 based on electric signals inputted to the driving circuit 127, to rotate the movable substrate 101, thereby taking out motive power from electric power.

Figure 2:
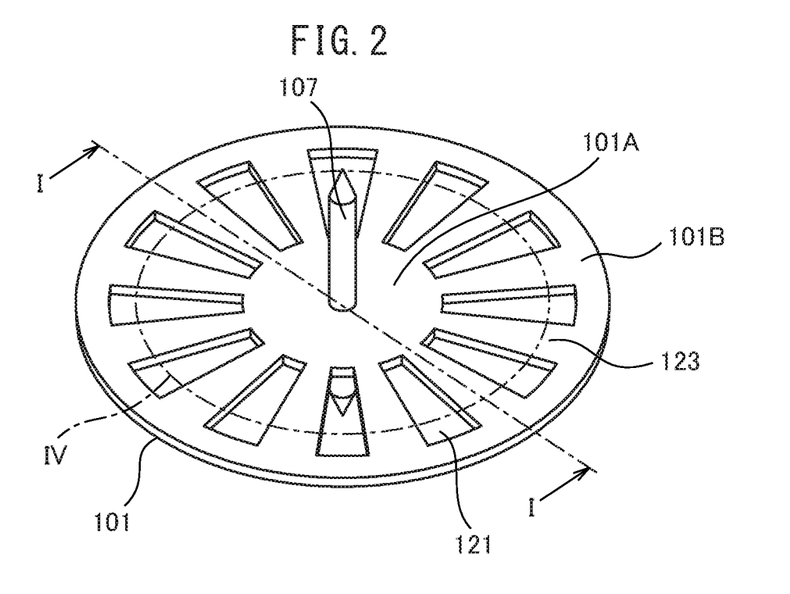
FIG. 2 is a perspective view of the movable substrate 101.
Figure 3:
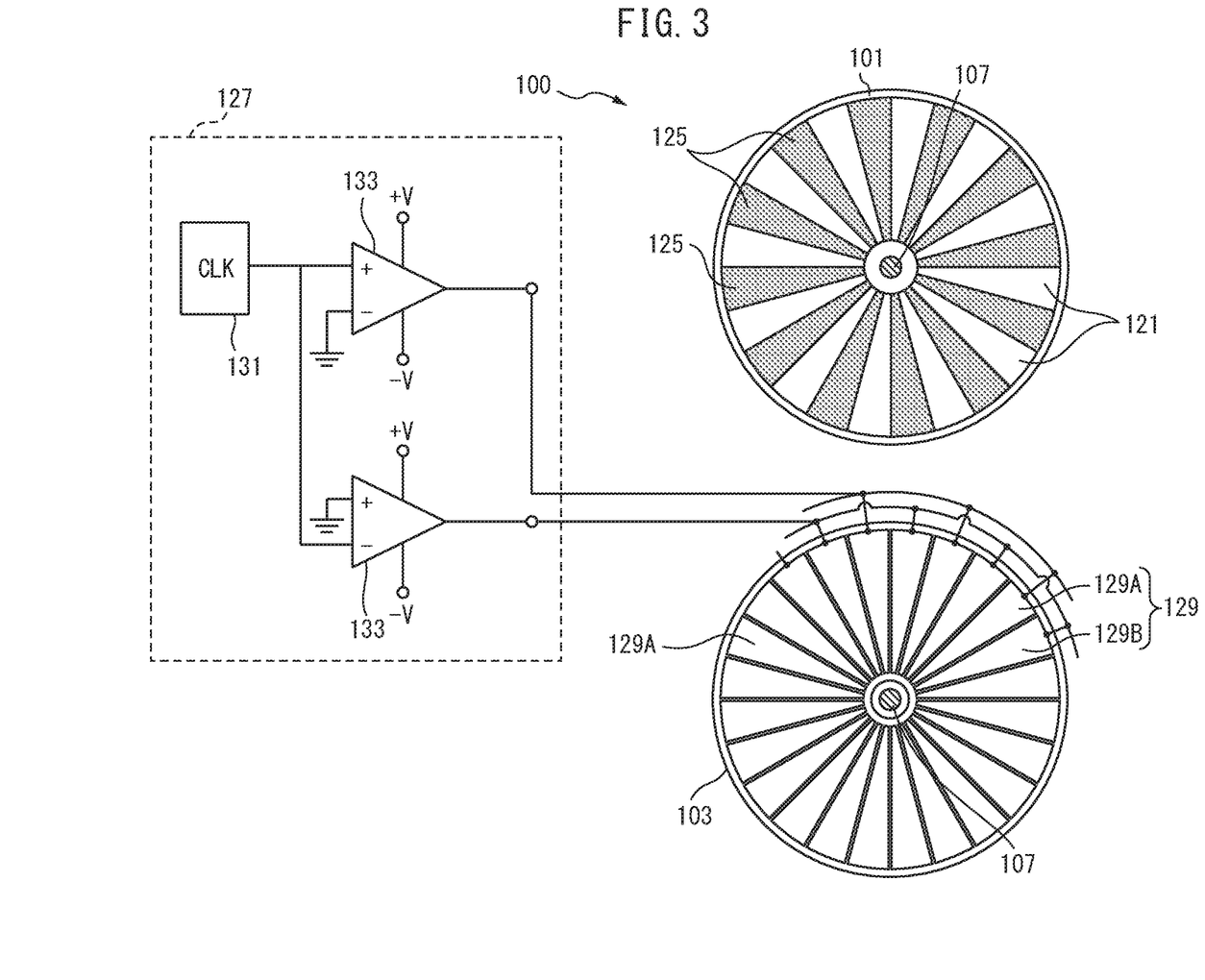
FIG. 3 is a diagram showing the lower surface of the movable substrate 101, the upper surface of the fixed substrate 103, and the driving circuit 127.
Figure 4:
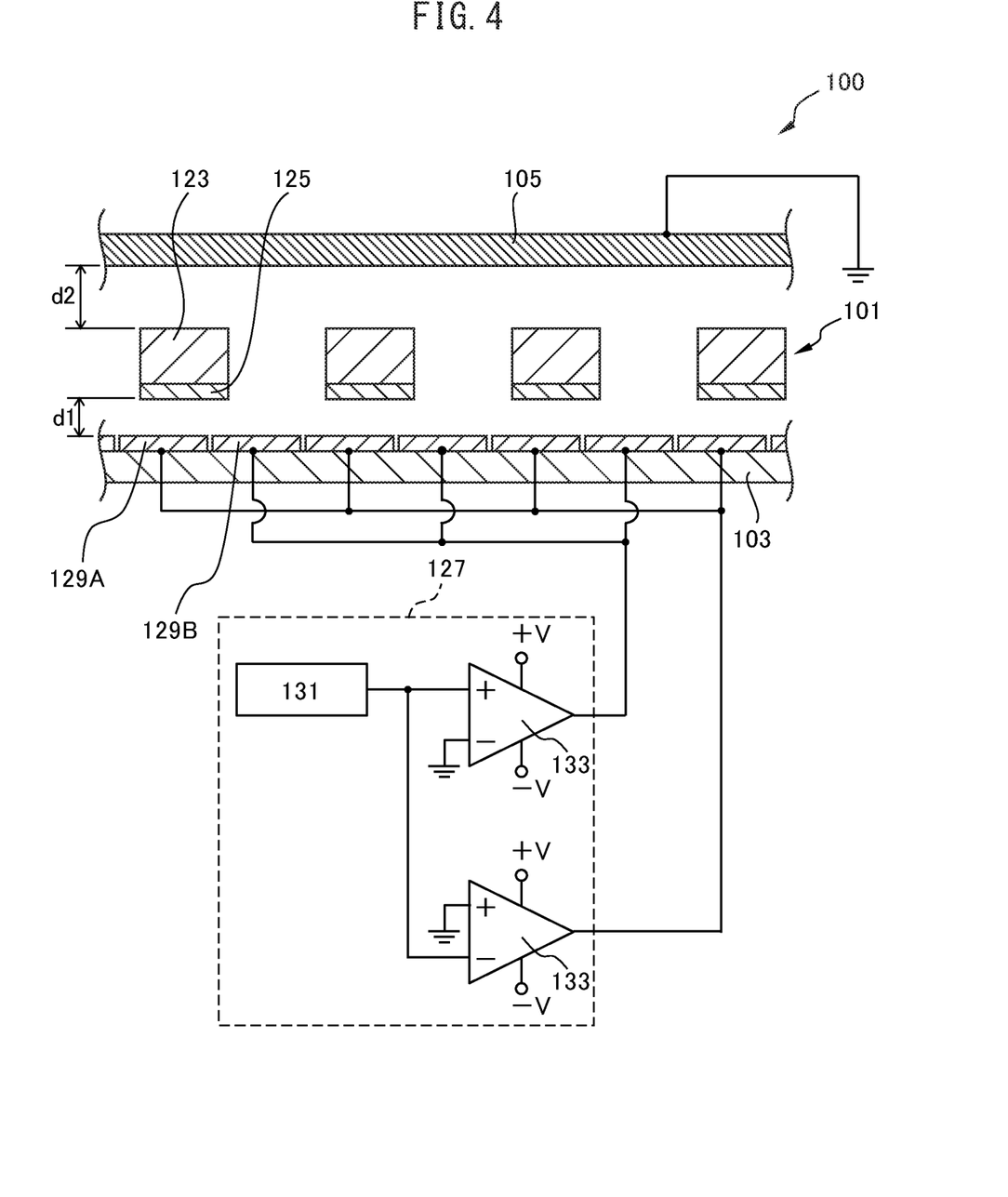
FIG. 4 is a diagram showing the driving circuit 127 and a cross section of a principal part of the electrostatic motor 100.

FIG. 2 is a perspective view of the movable substrate 101. FIG. 3 is a diagram showing the lower surface of the movable substrate 101, the upper surface of the fixed substrate 103, and the driving circuit 127. FIG. 4 is a diagram showing the driving circuit 127 and a cross section of a principal part of the electrostatic motor 100. FIG. 1 shows a cross section of the electrostatic motor 100 taken along a vertical plane including the diameter of the disk-shaped movable substrate 101 as indicated by reference numeral I in FIG. 2. FIG. 4 shows a cross section of the electrostatic motor 100 taken in the circumferential direction of the movable substrate 101 as indicated by reference numeral IV in FIG. 2.

As shown in FIG. 2, the movable substrate 101 is fixed at the center portion thereof to a shaft (rotating shaft) 107, and is rotatable around the shaft 107. As shown in FIG. 1, the movable substrate 101 is disposed in parallel with the fixed substrate 103, and is rotatable while maintaining a predetermined distance between the fixed substrate 103 and the movable substrate 101. Both ends of the shaft 107 are clamped by bearings 109, which are fixed to a main plate 111 and a top plate 113, respectively. The distance between the main plate 111 and the top plate 113 is kept constant by supports 115 disposed therebetween.

The material of the movable substrate 101 may be a dielectric, such as alumina and zirconia, a metal, such as copper and aluminum, or a semiconductor, such as silicon (Si). The movable substrate 101 is electrically insulated from the other components by using an insulator for the shaft 107 or the bearings 109 or fixing the bearings 109 to the top plate 113 and the main plate 111 with an insulating bonding layer interposed therebetween.

As shown in FIG. 2, the movable substrate 101 has a disk shape as a whole, and has through holes 121 radially arranged as seen from the center of the disk. These through holes 121 have a substantially trapezoidal shape, and the outer and center sides of each through hole 121 have an arc shape along the outer circumference of the movable substrate 101. Since the through holes 121 are provided, the shape of the movable substrate 101 is such that a center portion 101A and an outer portion 101B are connected by substantially trapezoidal connecting portions 123, and that the connecting portions 123 are radially arranged at intervals therebetween. The center portion 101A is a circular region (annular region except the place of the shaft 107) of the movable substrate 101 closer to the center than the through holes 121, and the outer portion 101B is an annular region of the movable substrate 101 closer to the outer edge than the through holes 121.

The charged films 125 are an example of the charged portions, and are formed on the lower surfaces of the connecting portions 123 of the movable substrate 101 (on the first surface facing the fixed substrate 103), as shown in FIG. 3. In other words, the charged films 125 respectively correspond to substantially trapezoidal sub-regions which are arranged radially around the shaft 107 at intervals in the circumferential direction (rotating direction) of the movable substrate 101. The charged films 125 are made of an electret material containing a fluororesin, such as polytetrafluoroethylene (PTFE), or an electret material based on an amorphous fluororesin, and carries a negative electric charge. Not only a fluororesin but also an inorganic material, such as $SiO_2$, may be used as the electret material of the charged films 125. In this description, the charged films 125 are assumed to be negatively charged, but may be made of a material which becomes positively charged.

The fixed substrate 103 is a driving-electrode substrate on which the opposing electrodes (driving electrodes) 129 for driving the movable substrate 101 are disposed, and is made of a well-known substrate material, such as a glass epoxy substrate. The fixed substrate 103 has a disk shape, for example, as shown in FIG. 3, and is fixed to the upper surface of the main plate 111 so as to face the lower surface of the movable substrate 101.

The opposing electrodes 129 are divided into two groups of opposing electrodes 129A and opposing electrodes 129B, and each of these groups is composed of substantially trapezoidal electrodes, as shown in FIGS. 3 and 4. The opposing electrodes 129A and 129B are formed on the upper surface of the fixed substrate 103 (the surface facing the movable substrate 101) alternately in the circumferential direction and radially around the shaft 107. Therefore, the charged films 125 and the opposing electrodes 129 are arranged on the movable substrate 101 and the fixed substrate 103, respectively, so as to face each other in the electrostatic motor 100. Both of the opposing electrodes 129A and the opposing electrodes 129B are formed at intervals in the circumferential direction and evenly spaced, similarly to the charged films 125. It is preferred that the widths of the charged films 125, the opposing electrodes 129A and the opposing electrodes 129B be the same or substantially the same on the same circumference centered at the shaft 107, and that the numbers of charged films 125, opposing electrodes 129A and opposing electrodes 129B be the same.

The driving circuit 127 is an example of the driving unit, and includes a clock 131 and two comparators 133. As shown in FIGS. 3 and 4, the output of the clock 131 is connected to an input of each comparator 133, and the output of one of the comparators 133 and that of the other comparator 133 are connected to the opposing electrodes 129A and the opposing electrodes 129B, respectively, through electric wiring. The driving circuit 127 uses the clock 131, as an oscillator, and the two comparators 133 to generate square waves whose phases are different from each other, thereby applying square-wave voltages having different phases to the adjacent opposing electrodes 129A and 129B, respectively. Thus, the interaction with the charged films 125 causes electrostatic attraction and repulsion to be applied to the charged films 125, which generates force moving the movable substrate 101.

The driving circuit 127 applies an alternating voltage whose polarity is alternately reversed to the opposing electrodes 129 in this manner, to continuously generate electrostatic force between the charged films 125 and the opposing electrodes 129, thereby rotating the movable substrate 101. The force applied to the charged films 125 is divided into a component acting in the horizontal direction of FIG. 1 to rotate the movable substrate 101 around the shaft 107 (hereinafter referred to as "driving force"), and a component acting on the movable substrate 101 in the vertical direction of FIG. 1 (hereinafter referred to as "normal force"). The normal force is transmitted to the shaft 107 to generate friction between the shaft 107 and the bearings 109. Therefore, in order to obtain an electrostatic motor 100 which has small loss of driving force and can stably operate, it is desirable to increase the driving force and reduce the normal force at the same time.

The ground electrode 105 is an electrically grounded electrode, and is disposed between the movable substrate 101 and the top plate 113, on the side opposite to the fixed substrate 103 with respect to the movable substrate 101. In other words, the ground electrode 105 faces the second surface of the movable substrate 101, the second surface being opposite to the first surface facing the fixed substrate 103. In order to ground the ground electrode 105 outside the electrostatic motor 100, the ground electrode 105 is preferably disposed so as to penetrate the supports 115, for example, as shown in FIG. 1.

Figure 5:
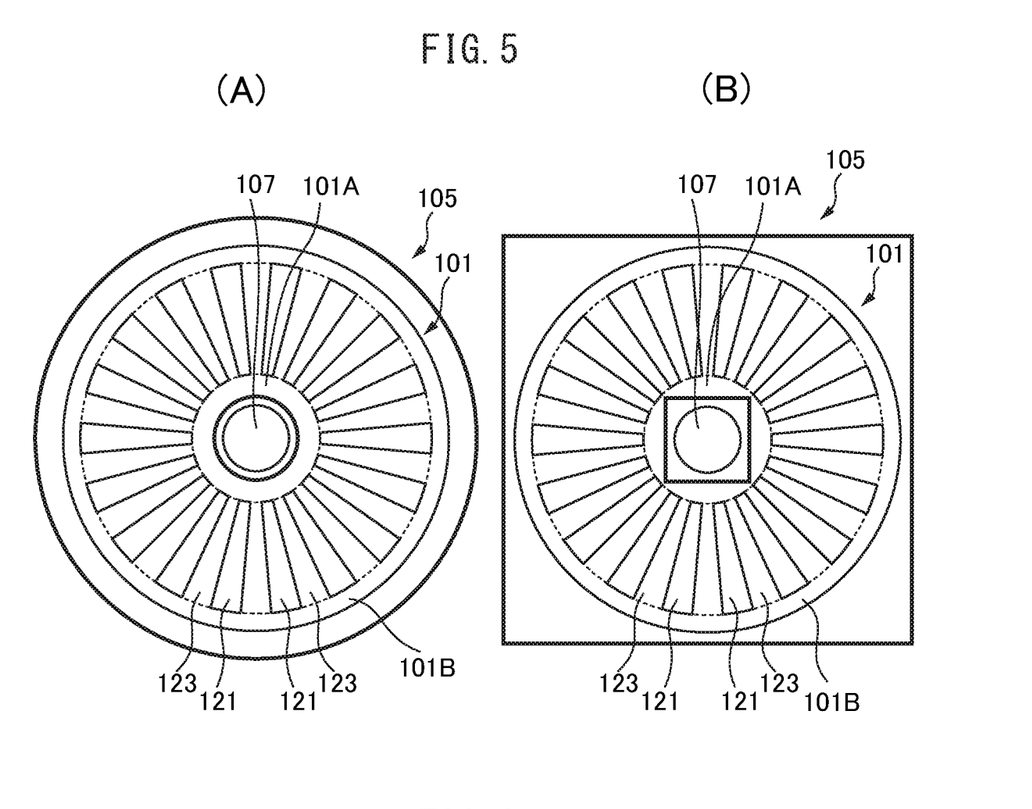
FIGS. 5(A) and 5(B) are plan views showing examples of the shape of the ground electrode 105.

FIGS. 5(A) and 5(B) are plan views showing examples of the shape of the ground electrode 105. These figures show the ground electrode 105 seen from the top plate 113 as being transparent, and also shows the movable substrate 101 superposed on the ground electrode 105, so as to clarify the positional relationship between the movable substrate 101 and the ground electrode 105. As shown in these figures, the ground electrode 105 may be circular or rectangular. For example, the ground electrode 105 may completely cover the entire region defined by the supports 115 and placed between the main plate 111 and the top plate 113, except the center portion through which the shaft 107 passes. It is preferred that the area of the ground electrode 105 be as large as possible. In particular, it is preferred that the ground electrode 105 cover all the connecting portions 123 of the movable substrate 101 corresponding to the places where the charged films 125 are disposed.

However, the ground electrode 105 need not necessarily cover the entire surface of the movable substrate 101. For example, the ground electrode 105 need not necessarily cover the center portion 101A and the outer portion 101B of the movable substrate 101, and neither need it cover some of the connecting portions 123 if it covers most of the connecting portions 123.

Figure 6:
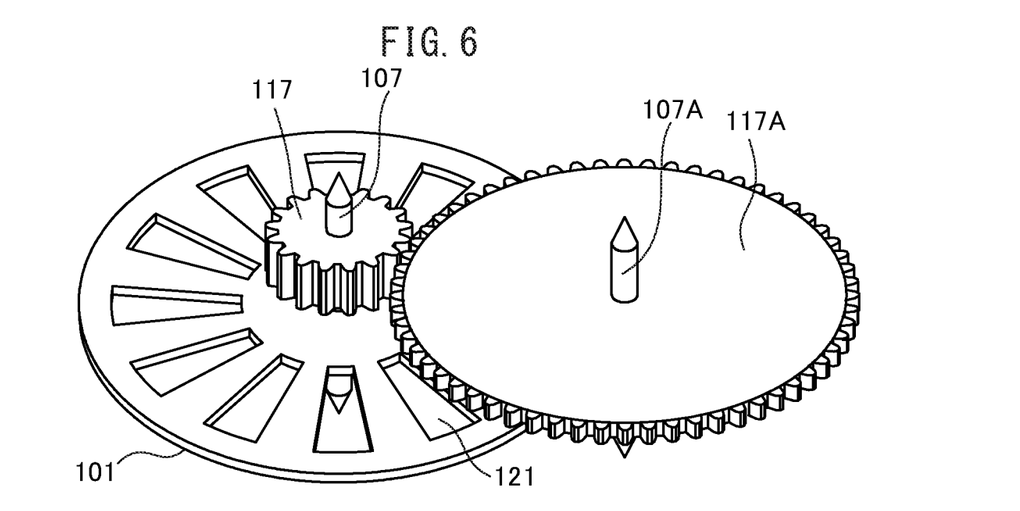
FIG. 6 is a perspective view of the gear 117 coupled to the shaft 107.

FIG. 6 is a perspective view of the gear 117 coupled to the shaft 107. As shown in FIGS. 1 and 6, the gear 117 is fixed to the shaft 107 on the side opposite to the movable substrate 101 with respect to the ground electrode 105, between the ground electrode 105 and the top plate 113, and rotates around the shaft 107. Further, the gear 117 is coupled to another gear 117A rotating around another shaft 107A in the electrostatic motor 100. However, in FIG. 1, the shaft 107A and the gear 117A are omitted from illustration, and in FIG. 6, the ground electrode 105 is omitted. It is preferred that these gears be made of an insulating material (nonconductive material), such as a resin, in order not to cause an electric trouble even if the gears come into contact with the movable substrate 101. The gears 117 and 117A are an example of the gear train, and rotate together with the movable substrate 101 to transmit the rotational motion of the movable substrate 101 to the outside of the electrostatic motor. In the electrostatic motor 100, the motive power of the movable substrate 101 is taken out via these gears.

Figure 7:
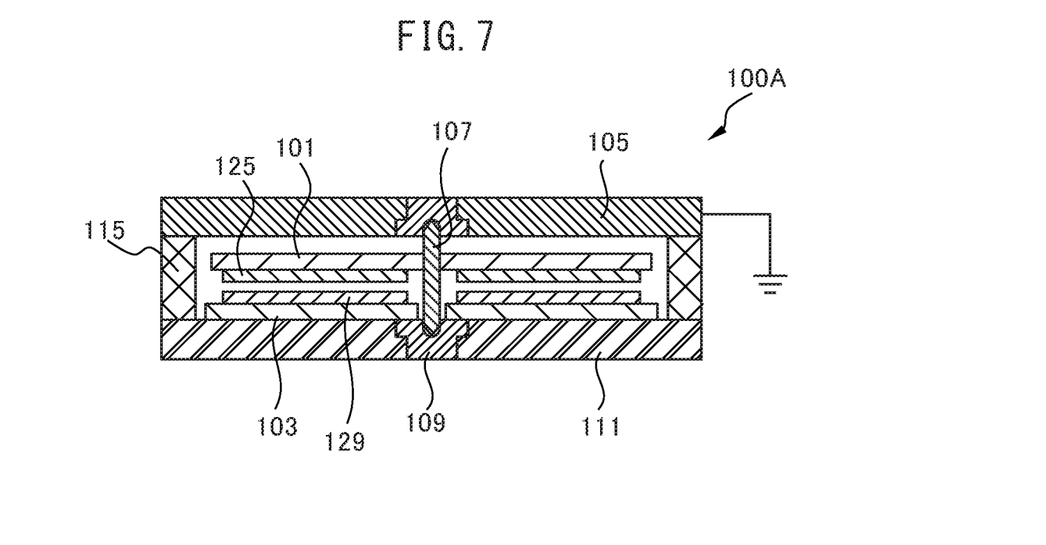
FIG. 7 is a cross-sectional view schematically illustrating the structure of another electrostatic motor 100A.

FIG. 7 is a cross-sectional view schematically illustrating the structure of another electrostatic motor 100A. The electrostatic motor 100A is identical in structure to the electrostatic motor 100 of FIG. 1, except that the top plate thereof is the ground electrode 105. The structure of electrostatic motors is not limited to the one shown in FIG. 1, in which the ground electrode 105 is disposed as a separate component between the top plate 113 and the main plate 11; and the top plate may serve as the ground electrode 105 as shown in FIG. 7. In the electrostatic motor 100A, since it is not necessary to provide a space for the ground electrode 105 between the top plate and the movable substrate 101, the thickness of the electrostatic motor is correspondingly small. In the electrostatic motor 100A, a gear which is the same as the gear 117 in the electrostatic motor 100 may be fixed to the shaft 107 between the movable substrate 101 and the ground electrode (top plate) 105, and may be coupled to another gear 117A.

Alternatively, if the positions of the fixed substrate 103 and the movable substrate 101 are reversed and the fixed substrate 103 is disposed on the side closer to the top plate, the main plate 111 may be grounded for use as the ground electrode 105. Further, without using the top plate 113 or the main plate 111 as the ground electrode 105, the ground electrode 105 may be separately provided on the top plate 113 or the main plate 111 so as to face the movable substrate 101. In this case, the ground electrode 105 may be disposed, for example, on the entire surface of the top plate 113 or the main plate 111, or only some of that surface.

Figure 8:
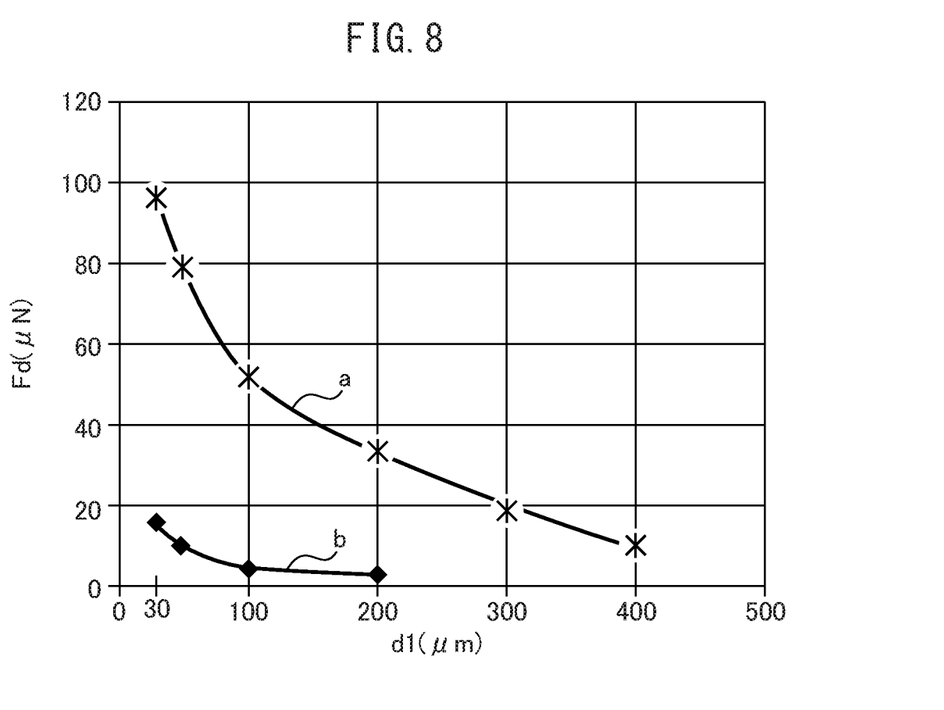
FIG. 8 is a graph showing the relationship between the driving force Fd and the distance d1 between the charged films 125 and the opposing electrodes 129.

FIG. 8 is a graph showing the relationship between the driving force Fd and the distance d1 (see FIG. 4) between the charged films 125 and the opposing electrodes 129. The abscissa and ordinate of FIG. 8 represent the distance d1 (in m) and the driving force Fd (in µN), respectively. In FIG. 8, the curve a represents the driving force of the electrostatic motor 100, whereas the curve b represents, as a comparative example, the driving force of another electrostatic motor (hereinafter referred to as "electrostatic motor 200") which has the same structure as the electrostatic-type electromechanical transducer 200 of FIG. 12. In other words, the curve a corresponds to an electrostatic motor which includes a ground electrode 105 on the side opposite to the fixed substrate 103 with respect to the movable substrate 101, whereas the curve b corresponds to an electrostatic motor which does not include this ground electrode 105.

As shown in FIG. 8, the driving force changes in accordance with the distance d1 between the charged films 125 and the opposing electrodes 129 shown in FIG. 4, becomes larger as the distance d1 reduces, and is larger in the electrostatic motor 100 than in the electrostatic motor 200. In the electrostatic motor 100, the apparent surface potential V of the charged films 125 is a value obtained by dividing the amount of electric charge Q of the charged films 125 by the capacity C between the charged films 125 and the ground electrode 105, and this capacity C becomes smaller as the distance between the movable substrate 101 and the ground electrode 105 increases. Thus, in the electrostatic motor 100, the apparent surface potential V of the charged films 125 can be increased, as the distance between the movable substrate 101 and the ground electrode 105 is increased to reduce the capacity C. Therefore, it is conceivable that the driving force of the electrostatic motor 100 is larger than that of the electrostatic motor 200, due to the ground electrode 105 disposed at a place facing a surface of the movable substrate 101, which surface is opposite to the charged films 125.

If only the driving force is taken into consideration, it is preferred that the distance d1 between the charged films 125 and the opposing electrodes 129 be as small as about several tens of micrometers. However, even if the distance d1 is about 300 µm, the driving force of the electrostatic motor 100 is larger than that of the electrostatic motor 200; and thus, the distance d1 may be in the range from several tens of micrometers to about 300 µm. A larger distance d1 makes the assembly of the electrostatic motor 100 easier.

Figure 9:
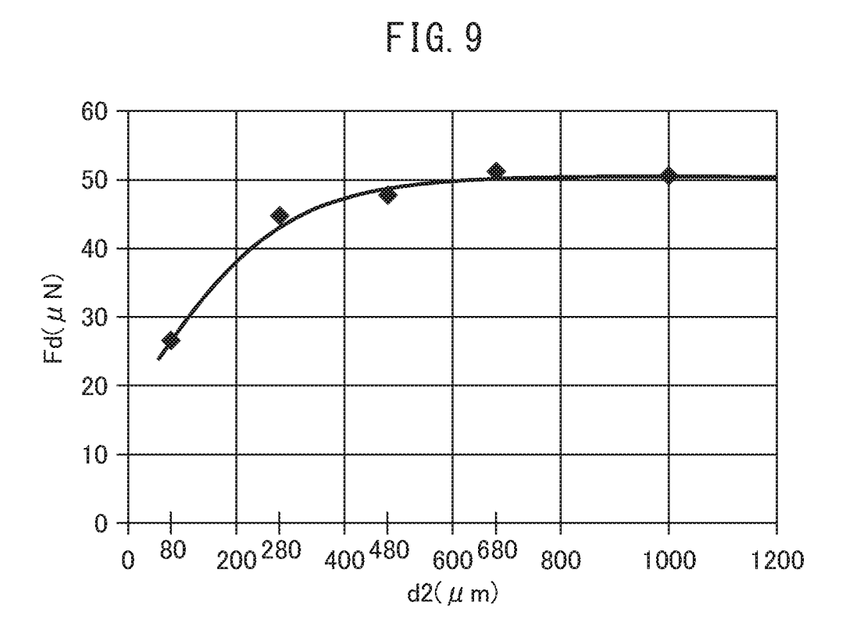
FIG. 9 is a graph showing the relationship between the driving force Fd and the distance d2 between the movable substrate 101 and the ground electrode 105 of the electrostatic motor 100.

FIG. 9 is a graph showing the relationship between the driving force Fd and the distance d2 (see FIG. 4) between the movable substrate 101 and the ground electrode 105 of the electrostatic motor 100. The abscissa and ordinate of FIG. 9 represent the distance d2 (in µm) and the driving force Fd (in µN), respectively. As shown in FIG. 9, the driving force becomes larger, as the distance d2 between the movable substrate 101 and the ground electrode 105 increases, but the driving force changes little in the range where the distance d2 is above 400 µm, even if the distance d2 is increased. The graph of FIG. 9 shows that the distance d2 between the movable substrate 101 and the ground electrode 105 is preferably not less than 400 µm. The increase in the distance d2 leads to an increase in thickness of the electrostatic motor 100, and it is desirable that the distance d2 be small in applications such as portable electric equipment. Thus, the value of the distance d2 is appropriately determined in consideration of the thickness and the driving force of the electrostatic motor 100.

Figure 10:
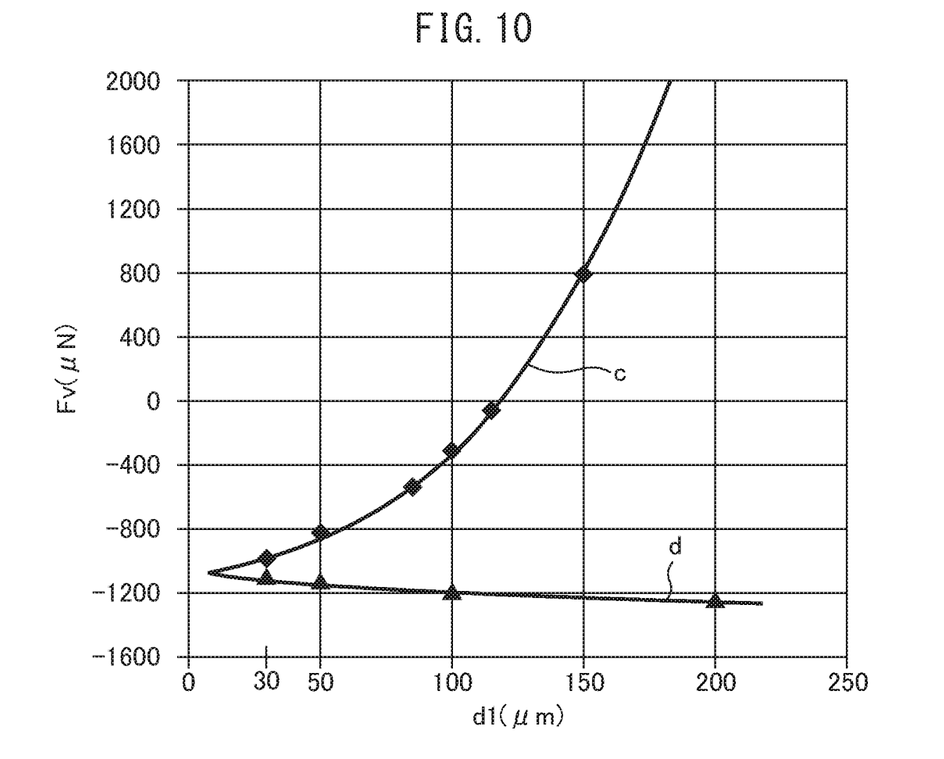
FIG. 10 is a graph showing the relationship between the normal force Fv and the distance d1 between the charged films 125 and the opposing electrodes 129.

FIG. 10 is a graph showing the relationship between the normal force Fv and the distance d1 between the charged films 125 and the opposing electrodes 129. The abscissa and ordinate of FIG. 10 represent the distance d1 (in µm) and the normal force Fv (in µN), respectively. In FIG. 10, the curve c represents the normal force of the electrostatic motor 100, whereas the curve d represents that of the electrostatic motor 200 of the comparative example. The sign of the normal force is defined such that the direction toward the opposing electrodes 129 is negative and the direction away from the opposing electrodes 129 is positive.

In the electrostatic motor 200, the normal force is negative as shown in FIG. 10, and thus attraction acts between the charged films 125 and the opposing electrodes 129. The absolute value of the normal force of the electrostatic motor 200 is substantially constant (about 1200 µN), regardless of the distance d1 between the charged films 125 and the opposing electrodes 129. In contrast, the normal force of the electrostatic motor 100 depends on the distance d1. The reason for this may be that, in the electrostatic motor 100, attraction acting between the movable substrate 101 and the ground electrode 105 cancels out the attraction acting between the charged films 125 and the opposing electrodes 129. In the range where the distance d1 is from 30 µm to 150 µm, the absolute value of the normal force acting on the electrostatic motor 100 is at most from 800 to 1000 µN, and is smaller than that acting on the electrostatic motor 200, which is preferable. In the electrostatic motor 100, the normal force is zero when the distance d1 is about 120 µm.

The graphs in FIGS. 8 to 10 shows that, in order to make the driving force larger than that of the electrostatic motor 200, the distance d1 between the charged films 125 and the opposing electrodes 129 is preferably not less than 30 µm and not more than 300 µm, and that the distance d2 between the movable substrate 101 and the ground electrode 105 is preferably not less than 400 µm. Further, in order to make the normal force smaller than that of the electrostatic motor 200, the distance d1 is preferably not less than 30 µm and not more than 150 µm. If both the driving force and the normal force are taken into consideration, the distance d1 is preferably not less than 30 µm and not more than 150 µm.

As described above, the electrostatic motor 100 includes a ground electrode 105 disposed at a place facing a surface of the movable substrate 101, which surface is not provided with the charged films 125. In the electrostatic motor 100, this makes the driving force larger, improves tolerance to variations of a load and to external perturbations, and reduces the friction between the shaft 107 and the bearings 109 to make the loss of driving force smaller.

Figure 11:
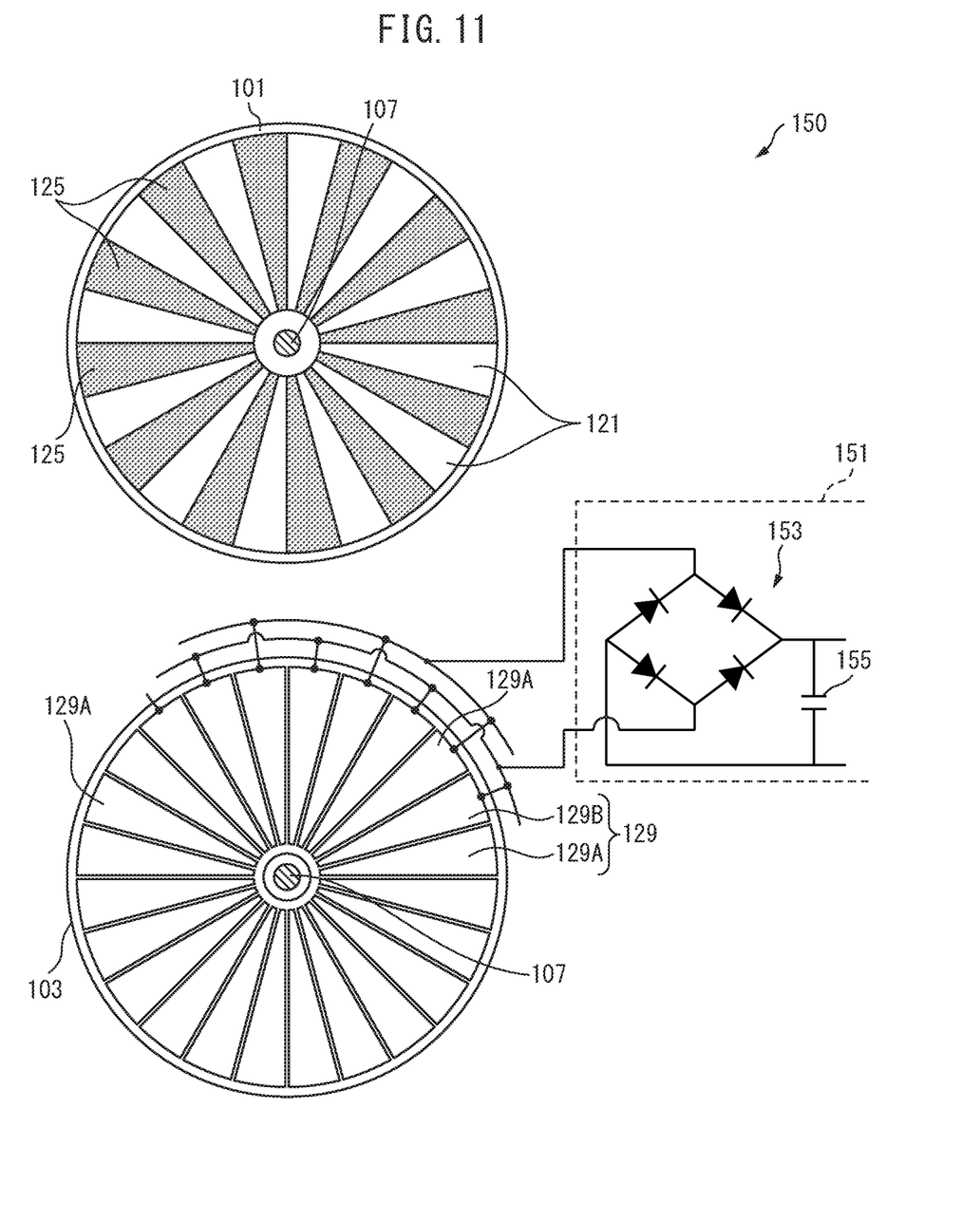
FIG. 11 is a diagram schematically illustrating the structure of an electric generator 150.

FIG. 11 is a diagram schematically illustrating the structure of an electric generator 150. The electric generator 150 is identical in structure to the electrostatic motor 100, except that it includes a charging circuit 151 instead of the driving circuit 127 of FIG. 3. FIG. 11 shows the lower surface of the movable substrate 101, the upper surface of the fixed substrate 103, and the charging circuit 151, similarly to FIG. 3. The overall cross-sectional view of the electric generator 150 is the same as that shown in FIG. 1, except that reference numeral 100 is changed to 150. The electric generator 150 is an example of the electrostatic-type electromechanical transducer, and rotates the movable substrate 101 with kinetic energy of the external environment, to cause electrostatic induction and generate static electricity between the charged films 125 and the opposing electrodes 129, thereby taking out electric power from motive power.

In the electric generator 150 also, as is the case with the electrostatic motor 100 shown in FIG. 6, a gear 117 is fixed to the shaft 107 on the side opposite to the movable substrate 101 with respect to the ground electrode 105, and is coupled to another gear 117A rotating around another shaft 107A. In the electric generator 150, for example, a rotary weight (not shown) having an uneven weight balance is attached to the shaft 107A, and is driven by an external power source to rotate around the shaft 107A. Thus, the rotational motion of the rotary weight is transmitted via the gear 117A to the gear 117, which allows the shaft 107 and the movable substrate 101 to rotate. In the electric generator 150, the motive power of an external power source is transmitted via the gears 117 and 117A to the movable substrate 101.

The rotation of the movable substrate 101 increases and decreases the overlapping area between the charged films 125 of the movable substrate 101 and the opposing electrodes 129A and 129B. Along with this, the electric field generated by the charged films 125 increases and decreases the electric charge attracted to the opposing electrodes 129A and 129B. The electric generator 150 uses electrostatic induction in this manner to generate an alternating current between the opposing electrodes 129A and the opposing electrodes 129B, thereby generating electric power.

The charging circuit 151 includes a rectifier circuit 153 and a storage battery 155. The charging circuit 151 is an example of the charging unit, and stores electric power generated by electrostatic induction between the charged films 125 and the opposing electrodes 129A and 129B in response to the rotation of the movable substrate 101. The opposing electrodes 129A and 129B of the electric generator 150 are connected to the rectifier circuit 153 through electric wiring, and the rectifier circuit 153 is connected to the storage battery 155. The rectifier circuit 153 is a bridge circuit including four diodes, and rectifies the current generated between the opposing electrodes 129A and the opposing electrodes 129B. The storage battery 155 is a chargeable and dischargeable battery, such as a lithium-ion battery, stores the electric power generated by the electric generator 150, and supplies the electric power to a circuit (not shown) to be driven.

The electric generator 150 also includes a ground electrode 105 disposed at a place facing a surface of the movable substrate 101, which surface is not provided with the charged films 125. This increases the apparent surface potential V of the charged films 125, and correspondingly increases the amount of generated electric power. Further, the electric generator 150 also has the effect of reducing the friction between the shaft 107 and the bearings 109, similarly to the electrostatic motor 100.

The rotation-type electrostatic motor and electric generator have been described above. However, since the important thing is to provide a ground electrode on the side opposite to the fixed substrate with respect to the movable substrate, it is clear that electrostatic motors and electric generators in which the movable substrate reciprocates also have the same advantageous effect.

The invention claimed is:

1. An electrostatic-type electromechanical transducer using electrostatic interaction between charged portions and opposing electrodes to transduce between electric power and motive power, the electrostatic-type electromechanical transducer comprising:
   a fixed substrate;
   a movable substrate being movable while maintaining a predetermined distance between the fixed substrate and the movable substrate;
   charged portions disposed on a first surface of the movable substrate at intervals in a direction of movement of the movable substrate, the first surface facing the fixed substrate;
   opposing electrodes disposed on the fixed substrate in the direction of movement, the opposing electrodes facing the movable substrate; and
   a ground electrode facing a second surface of the movable substrate, the second surface being opposite to the first surface.

2. The electrostatic-type electromechanical transducer according to claim 1, wherein the ground electrode completely covers a region on the second surface of the movable substrate, the region corresponding to the places where the charged portions are disposed.

3. The electrostatic-type electromechanical transducer according to claim 1, wherein the distance between the movable substrate and the fixed substrate is not less than 30 μm and not more than 150 μm.

4. The electrostatic-type electromechanical transducer according to claim 1, wherein
   the movable substrate and the fixed substrate are disposed between a top plate and a main plate, and
   the ground electrode is formed on the top plate or the main plate, and faces the movable substrate.

5. The electrostatic-type electromechanical transducer according to claim 1, wherein
   the movable substrate and the fixed substrate are disposed between a top plate and a main plate, and
   the top plate or the main plate serves as the ground electrode.

6. The electrostatic-type electromechanical transducer according to claim 1, wherein
   the movable substrate is rotatable around a rotating shaft passing through the center of the movable substrate, and
   the charged portions and the opposing electrodes are radially disposed around the rotating shaft.

7. The electrostatic-type electromechanical transducer according to claim 6, further comprising:
   a driving unit applying an alternating voltage to the opposing electrodes to generate electrostatic force between the charged portions and the opposing electrodes, thereby rotating the movable substrate; and
   a gear train coupled to the rotating shaft on the side opposite to the movable substrate with respect to the ground electrode, the gear train rotating together with the movable substrate to transmit rotational motion of the movable substrate to the outside of the electrostatic-type electromechanical transducer.

8. The electrostatic-type electromechanical transducer according to claim 6, further comprising:
   a gear train coupled to the rotating shaft on the side opposite to the movable substrate with respect to the ground electrode, the gear train being driven by an external power source to rotate the rotating shaft and the movable substrate; and
   a charging unit storing electric power generated by electrostatic induction between the charged portions and the opposing electrodes in response to rotation of the movable substrate.

* * * * *